United States Patent [19]

Begland

[11] 3,914,279

[45] Oct. 21, 1975

[54] AMINOMETHYLENEAMINOMALEONITRILES

[75] Inventor: Robert Walter Begland, Wilmington, Del.

[73] Assignee: E. I. Du Pont de Nemours & Company, Wilmington, Del.

[22] Filed: Aug. 8, 1973

[21] Appl. No.: 386,746

Related U.S. Application Data

[63] Continuation-in-part of Ser. No. 229,556, Feb. 25, 1972, Pat. No. 3,806,517.

[52] U.S. Cl............ 260/465.5 R; 71/105; 260/252; 260/309; 260/464
[51] Int. Cl........................................... C07c 121/42
[58] Field of Search...................... 260/465.5 R, 464

[56] References Cited

UNITED STATES PATENTS

| | | | |
|---|---|---|---|
| 2,534,331 | 12/1950 | Woodward | 260/309 |
| 3,564,039 | 2/1971 | Webster | 260/465.5 R |
| 3,701,797 | 10/1972 | Okada et al. | 260/465.5 R |
| 3,763,161 | 10/1973 | Hartter | 260/465.5 R X |
| 3,778,446 | 12/1973 | Weigert | 260/465.5 R X |

*Primary Examiner*—Joseph P. Brust
*Attorney, Agent, or Firm*—Anthony P. Mentis

[57] ABSTRACT

2-Amino-3-(substitutedaminomethyleneamino)-maleonitriles are obtained by reaction of diaminomaleonitrile with N-substituted carboxamides in the presence of $POCl_3$. The compounds are useful as herbicides or can be converted to dicyanoimidazoles useful for synthesis of purine alkaloids.

4 Claims, No Drawings

AMINOMETHYLENEAMINOMALEONITRILES

CROSS-REFERENCE TO RELATED APPLICATION

This application is a continuation-in-part of my copending application Ser. No. 229,556, filed Feb. 25, 1972, now U.S. Pat. No. 3,806,517, issued Apr. 23, 1974.

BACKGROUND OF THE INVENTION

1. Field Of The Invention

This invention relates to 2-amino-3-(N-substituted-aminomethyleneamino)maleonitriles of the formula

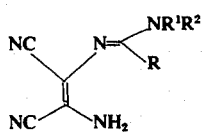

wherein R and $R^1$ are each alkyl of 1 to 4 carbons, cycloalkyl of 3 to 4 carbons, and $R^2$ is H or a 1–4 carbon alkyl.

DESCRIPTION OF THE PRIOR ART 3-(Dimethylaminomethyleneamino)pyrazine-2-carbonitrile has been reported by Albert & Ohta (J. Chem. Soc., 1971, 3727–3730). This was prepared from the reaction of dimethylformamide and phosphoryl chloride on 3-aminopyrazine-2-carboxamide or 3-aminopyrazine-2-carbonitrile.

DESCRIPTION OF THE INVENTION

The aminomethyleneaminomaleonitriles have the formula

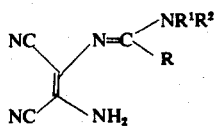

wherein R and $R^1$ are each alkyl of 1–4 carbons or cycloalkyl of 3–4 carbons and $R^2$ is H or a 1–4 carbon alkyl. These compounds are obtained by reaction of diaminomaleonitrile(DAMN) with an amide

in the presence of a condensing agent such as $POCl_3$ at temperatures below 100° and preferably not above 50°. The reaction involved is:

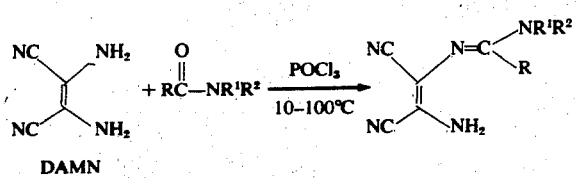

The amides that can be used contain hydrocarbyl substituents of up to 4 carbons that are inert to the condensing agent. Amides that can be employed include N,N-di-n-butylacetamide, N,N-diethylvaleramide, N,N-di-n-propylbutyramide, N,N-dimethylcyclobutylcarboxamide, N,N-diisopropylacetamide, and N,N-dimethyl-2,2-dimethylpropionamide.

The preferred condensing agent is $POCl_3$ and the best yields are obtained when about 0.4 mole of $POCl_3$ is used with 1 mole of diaminomaleonitrile. The amount of condensing agent is preferably between about 0.33 mole to 2 moles or more per mole of diaminomaleonitrile. Other agents that can be used include $POBr_3$, $PCl_3$, or $PCl_5$ (phosphorus oxybromide, phosphorus trichloride or phosphorus pentachloride, respectively) at a temperature of 0°–100°C and preferably in the range 10°–50°C.

Solvents such as tetrahydrofuran or acetonitrile can be present in the condensation reaction. Excess amide can generally serve as solvent for the reaction.

The amide is present in at least a 1:1 molar ratio of the diaminomaleonitrile and generally is employed in amounts of 1–10 or more moles per mole of diaminomaleonitrile.

Diaminomaleonitrile is a known compound and can be prepared from HCN and an alkali metal cyanide using a solvent such as dimethylformamide generally at below about 20°C, as described in Webster U.S. Pat. No. 3,564,039.

SPECIFIC EMBODIMENTS OF THE INVENTION

The following are illustrative examples of the preparation of compounds of this invention.

EXAMPLE 1

2-Amino-3(N,N-diethylaminoethylideneamino)-maleonitrile

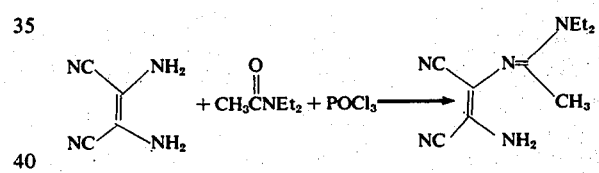

To a solution of 10.8 g (0.10 mole) of diaminomaleonitrile in 70 ml of N,N-diethylacetamide was added 10 ml (~0.1 mole) of $POCl_3$ over 10 min. The temperature rose to 50° during addition. The resulting solution was cooled, poured into 200 ml of water and neutralized with conc. $NH_4OH$. An oil separated which was taken up in ethyl acetate, dried and the solvent removed to give a light yellow oil. Anhydrous HCl was added to an ether solution of this oil and a white precipitate formed. Recrystallization from methanol-ether gave 13.8 g (57%) of adduct as the HCl salt, mp 185°–186°.

Anal. Calcd. for $C_{10}H_{16}N_5Cl$: C, 49.69; H, 6.67; N, 28.97 Cl, 14.67.

Found: C, 49.40; H, 6.67; N, 28.65; Cl, 14.94.

ir (nujol) 3600, 3360, 2240, 1640, 1600 $cm^{-1}$.

nmr (DMSO-$d_6$) $\delta = 1.1$, broad triplet, 6H; $\delta = 2.20$, singlet, 3H; $\delta = 3.6$, broad peak, 4H; $\delta = 8.4$, broad, 2H.

EXAMPLE 2

2-Amino-3-(N,N-dimethylaminoethylideneamino)-maleonitrile

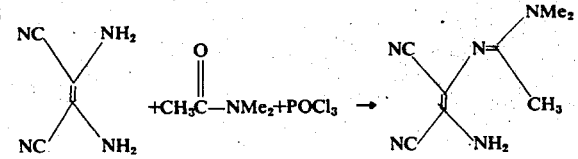

To a solution of 4.0 g (0.037 mole) of diaminomaleonitrile (DAMN) in 30 ml of dimethylacetamide at 10°C was added dropwise over 10 min. 4.8 g (0.031 mole) of phosphorous oxychloride (POCl₃). The temperature rose to 30°C and the solution became thick with precipitate. After one-half hour 400 ml of cold water was added and the resulting solution was Anal. Calcd. for $C_{12}H_{20}N_5Cl$: C, 53.43; H, 7.47; N, 25.96
Found: C, 53.12; H, 7.44; N, 26.11

EXAMPLE 4

2-Amino-3(N,N-dimethylamino-1-cyclopropylmethyleneamino)maleonitrile hydrochloride

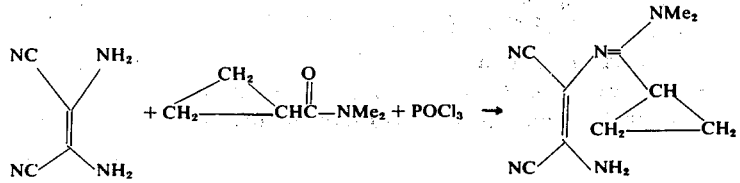

neutralized with conc. ammonium hydroxide. The precipitated product was collected, dissolved in 150 ml of chloroform, dried over anhydrous MgSO₄ and the solvent was removed to give 3.5 g (54%) of adduct. Recrystallization from benzene gave white needles, mp 110°–112°.
Anal. Calcd. for $C_8H_{11}N_5$: C, 54.22; H, 6.26; N, 39.52
Found: C, 54.45; H, 6.33; N, 39.74
ir (nujol); 3400, 3300, 2205, 2195 and 1565 cm⁻¹
nmr (CDCl₃/TMS) δ = 2.15, singlet, 3H; δ = 3.05, singlet, 6H; δ = 4.4, broad, 2H.

Heating this adduct at about 160°C with dimethylformamide gives 2-methyl-4,5-dicyanoimidazole.

A solution containing 10.8 g of diaminomaleonitrile, 20 g of N,N-dimethylcyclopropylcarboxamide, 100 ml of tetrahydrofuran and 10 ml of POCl₃ was stirred for 18 hr and the resulting precipitate was collected. Recrystallization from methanol gave 8.7 g (36%) of 2-amino-3(N,N-dimethylamino-1-cyclopropylmethyleneamino)maleonitrile hydrochloride as colorless crystals, mp 170°–172°: ir (nujol) 3200, 3100, 2200, 1645 and 1600 cm⁻¹; nmr (DMSO-d₆) 0.7–1.3δ (m, 4), 1.5–1.9δ (m, 1), 3,30δ (s, 6), 8.5δ (b, 3).

EXAMPLE 5

2-Amino-3-(N,N-dimethylamino-2-methylpropylideneamino)maleonitrile hydrochloride

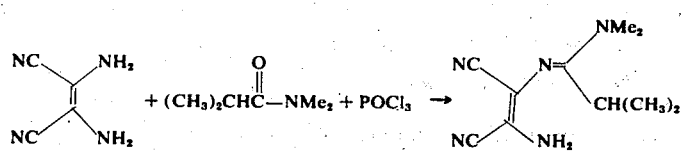

EXAMPLE 3

2-Amino-3-(N,N-diethylaminobutylideneamino)maleonitrile

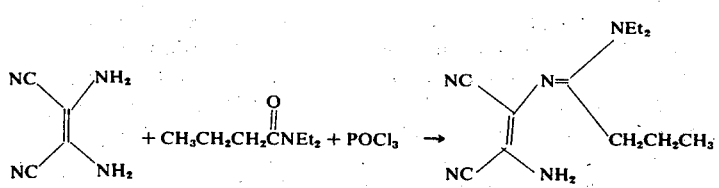

To a solution of 10.8 g (0.10 mole) of diaminomaleonitrile and 20 g of N,N-diethylbutyramide in 100 ml of tetrahydrofuran was added 10 ml of POCl₃ over 10 min. After stirring for 1.5 hr the resulting tan solid was collected and recrystallized from methanol-ether to give 7.2 g (27%) of 2-amino-3(N,N-diethylaminobutylideneamino)maleonitrile hydrochloride as colorless crystals, mp 188°–189°: ir (nujol) 3300–3000 (broad peak), 2185, 1640 and 1585 cm⁻¹; nmr (DMSO-d₆) 0.9–1.7δ (m, 11), 2.3–2.6δ (m, 2), 3.4–3.7δ (m, 4), 8.5δ (b, 2).

From 16.2 g (0.15 mole) of diaminomaleonitrile and 25 g of N,N-dimethylisobutyramide run as in Example 4 there was obtained 12.2 g of 2-amino-3(N,N-dimethylamino-2-methylpropylideneamino)maleonitrile hydrochloride.

EXAMPLE 6

2-Amino-3(N,N-dimethylaminopropenylamino)maleonitrile

To a solution of 10.8 g of diaminomaleonitrile and 15 g of N,N-dimethylpropionamide in 100 ml of tetrahydrofuran was added 10 ml of POCl₃ in 10 min. The temperature rose from 27° to 39° over 20 min. There was obtained 10.7 g tan powder which was decolorized with charcoal and recrystallized from methanol-ether to give 7.9 g of colorless plates of 2-amino-3(N,N-dimethylaminopropenylamino)maleonitrile hydrochloride; mp 185°–6°, ir (nujol) 3300, 3150, 2230, 1650, 1600 cm$^{-1}$.

Anal. Calcd. for $C_9H_{14}N_5Cl$: C, 47.47; H, 6.20; N, 30.76

Found: C, 47.07; H, 5.99; N, 30.71

EXAMPLE 7

2-Amino-3-(N-methylaminoethyleneamino)maleonitrile hydrochloride

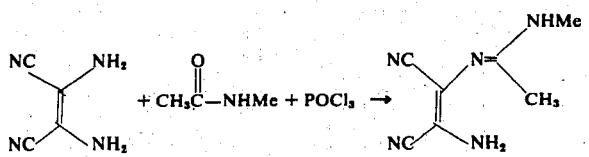

To a solution of 10.8 g (0.10 mole) of diaminomaleonitrile and 8.6 g (0.12 mole) of N-methylacetamide in 100 ml of tetrahydrofuran was added dropwise 10 ml of $POCl_3$ over 30 min. This reaction was quite exothermic and the temperature reached 50°. A precipitate began to form after ~one-half of the $POCl_3$ had been added. After 3 hrs the precipitate was collected and rinsed with ether to give 14.2 g (71%) of 2-amino-3-(N-methylaminoethyleneamino)maleonitrile hydrochloride as a light tan powder. Off-white crystals were obtained by dissolving in methanol, treating with decolorizing charcoal and adding ether, mp 240° dec.: ir (nujol) 3300, 3050, 2200 (strong), 1675, 1645, 1600, and 1575 cm$^{-1}$.

Anal. Calcd. for $C_7H_{10}N_5Cl$: C, 42.11; H, 5.05; N, 35.08

Found: C, 42.41; H, 5.10; N, 34.72

The amino group of the amino-containing maleonitriles obtained as herein described can be reacted with reagents that react with primary amine groups. When the amidine of Example 2 (4.0 g) was added in portions to 20 ml of acetic anhydride and the resulting solution stirred for 1 hr, poured over 100 ml of ice-$H_2O$, the resulting precipitate collected and recrystallized from benzene there was obtained 1.25 g (25%) of colorless needles of 2-acetylamino-3-(dimethylaminoethyleneamino)maleonitrile, mp 121°–124°: ir (nujol) 3100, 2195, 1650, 1560, 1500 cm$^{-1}$; nmr (DMSO-$d_6$) 2.01δ (s, 3), 2.13δ (s, 3), 3.09δ (s, 6), 9.25δ (b, 1).

Anal. Calcd. for $C_{10}H_{13}ON_5$: C, 54.78; H, 5.98; N, 31.95

Found: C, 54.71; H, 5.70; N, 31.88

The aminomethyleneaminomaleonitriles of this invention are useful for the preparation of 4,5-dicyanoimidazoles by heating, preferably in the presence of an amide, as shown by the equation

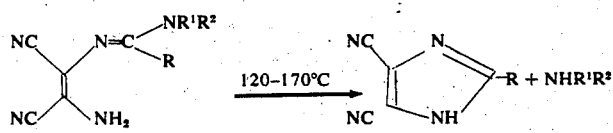

The imidazoles obtainable by the above process are useful for the preparation of purine and substituted purines, and particularly substituted xanthine alkaloids. The latter include theobromine and theophylline, and have medicinal and/or beverage uses. 4,5-Dicyanoimidazoles having a 2-substituent can be readily converted to substituted xanthines, e.g., hydrolysis of the dicyano groups gives the diamide in high yield. The latter on treatment with sodium hypochlorite gives xanthines which can be methylated as shown below:

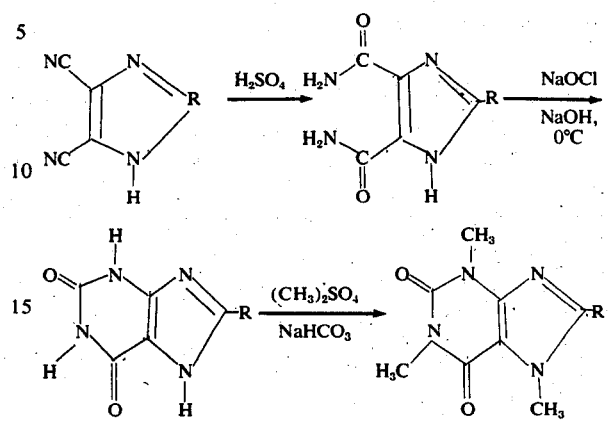

The compounds of the invention are useful as herbicides. Certain of the compounds control all plant growth and may be used to maintain industrial sites, right of ways, etc.; while others may be used to selectively weed such crops as corn, soybeans and sorghum. The rate to be used will depend upon the purpose of the application, the compound utilized, the soil type, rainfall, and other environmental conditions, and the weeds to be controlled. If one desires to selectively weed a crop, the proper compound and rate must be chosen and the compound is best applied preemergence to the crops and weeds. Rates used will ordinarily vary between one-half and 40 kg/ha (hectare), with the lower rates used for selective weed control and the higher rates where the kill of all vegetation is desired. The proper compound and rate to accomplish a particular task may be chosen by one with ordinary skill in the art.

The following tests illustrate the activity and utility of the compounds as herbicides.

Seeds of crabgrass (*Digitaria spp.*), barnyardgrass (*Echinochloa crusgalli*), wild oats (*Avena fatua*), Cassia tora, morningglory (*Ipomoea spp.*), mustard (*Brassica sp.*), radish (*Raphanus spp.*), marigold (*Tagetes spp.*), dock (*Rumex crispus*) bean, corn, soybean, rice, wheat and nutsedge tubers were planted in a growth medium and treated preemergence with the compounds dissolved in a non-phytotoxic solvent. At the same time cottom having five leaves (including cotyledonary ones), johnsongrass (*Sorghum halepense*) having four leaves, crabgrass and barnyardgrass with three leaves and nutsedge (*Cyperus rotundus*) from tubers with two leaves were treated. At the low rate, bush beans with the third trifoliate leaf expanding were treated. Treated plants and controls were maintained in a greenhouse for sixteen days, then all species were compared to controls and visually rated for responses to treatment. Tables 1 and 2 give the values for R, $R^1$ and $R^2$ in each of the compounds, and the results obtained.

Rating Symbols

C = chlorosis - necrosis
G = growth retarded
B = burn

H = hormonal activity
E = emergence inhibition
6Y = abcision of buds or flowers
O = no response
10 = maximum response wherein R and $R^1$ are each alkyl of 1–4 carbons or cycloalkyl of 3–4 carbons, and $R^2$ is H or an alkyl of 1–4 carbon atoms.

2. A compound according to Claim 1 in which $R^2$ is a 1–4 Carbon alkyl.

TABLE 1

PREEMERGENCE HERBICIDAL ACTIVITY

| R | $R^1$ and $R^2$ | Rate (Kg/Ha) | Crab-grass | Barnyard-grass | Sor-ghum | Wild Oats | Nuts-edge | Cassia | Morning-glory | Mus-tard | Radish | Mari-gold |
|---|---|---|---|---|---|---|---|---|---|---|---|---|
| $CH_3$ | $CH_3CH_2$ | 11 | 7G | 10E | 2C | 5C | 0 | 10C | 10C | 10C | 9C | 8C |
| | | 2.2 | 0 | 1C | 0 | 0 | 0 | 8C | 10C | 10C | 4G | 2G |
| $CH_3$ | $CH_3$ | 11 | 10E | 10E | 9C | 8C | 0 | 10C | 10C | 10C | 10C | 10C |
| | | 2.2 | 9C | 10E | 9C | 3C | 0 | 10C | 10C | 10C | 10C | 10C |
| $(CH_3)_2CH$ | $CH_3$ | 11 | 9C | 10C | 0 | 9C | 0 | 9C | 10E | 10E | 10E | 10E |
| | | 2.2 | 3C | 4C | 0 | 3C | 0 | 4C | 10C | 10C | 10C | 4C |
| $CH_3CH_2$ | $CH_3$ | 11 | 10C | 9C | 8C | 6C | 4G | 10C | 10C | 10C | 10C | 10C |
| | | 2.2 | 2C | 4C | 4G | 0 | 0 | 4C | 10C | 9C | 9C | 5C |
| $CH_3CH_2CH_2$ | $CH_3CH_2$ | 11 | 10E | 7C | 6C | 7C | 0 | 5C | 10C | 10C | 10C | 10C |
| | | 2.2 | 4G | 0 | 0 | 0 | 0 | 10C | 10C | 2C | 6G | |
| 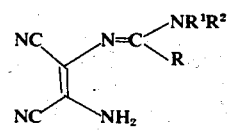 | $CH_3$ | 11 | 10C | 10C | 9C | 10C | 10E | 10C | 10E | 10E | 10E | 10E |
| | | 2.2 | 8C | 9C | 9C | 10C | 5G | 10C | 10C | 10C | 10C | 10E |

| R | $R^1$ and $R^2$ | Rate (Kg/Ha) | Dock | Bean | Corn | Soy-bean | Rice | Wheat |
|---|---|---|---|---|---|---|---|---|
| $CH_3$ | $CH_3CH_2$ | 11 | 9C | 10C | 3C | 5C | 4C | 5C |
| | | 2.2 | 8C | 0 | 0 | 0 | 0 | 0 |
| $CH_3$ | $CH_3$ | 11 | 10C | 8C | 7C | 7C | 6C | 6C |
| | | 2.2 | 10C | 7C | 1C | 2C | 3C | 2C |
| $(CH_3)_2CH$ | $CH_3$ | 11 | 10E | 9C | 3C | 7C | 3C | 6C |
| | | 2.2 | 9C | 7C | 0 | 5C | 0 | 1C |
| $CH_3CH_2$ | $CH_3$ | 11 | 10C | 10C | 8C | 8C | 4C | 4C |
| | | 2.2 | 10C | 3C | 3C | 2C | 2C | 1C |
| $CH_3CH_2CH_2$ | $CH_3CH_2$ | 11 | 10C | 5G | 3C | 2C | 6H | 5G |
| | | 2.2 | 6G | 3G | 0 | 0 | 2G | 0 |
| 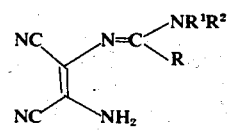 | $CH_3$ | 11 | 10E | 10E | 9C | 9C | 3C 8H | 3C 9H |
| | | 2.2 | 10C | 1C 6G | 8C | 7C | 3C | 7C |

Table 2

POSTEMERGENCE HERBICIDAL ACTIVITY

| R | $R^1$ and $R^2$ | Rate (Kg/Ha) | Nuts-edge | Cotton | Johnson-grass | Crab-grass | Barnyard-grass | Bean | Sor-ghum |
|---|---|---|---|---|---|---|---|---|---|
| $CH_3$ | $CH_3CH_2$ | 11 | — | 10C | 10C | 3C | 7C | — | — |
| | | 2.2 | 2B | 7B | 4B | 3B | 4B | 10C | 3B |
| $CH_3$ | $CH_3$ | 11 | 10C | 9B | 7B | 8C | 9C | — | — |
| | | 2.2 | — | — | — | — | — | 8C | 5B |
| $(CH_3)_2CH$ | $CH_3$ | 11 | 9C | 10B | 9B | 10B | 10B | — | — |
| | | 2.2 | 6C | 9C | 7C | 6C | 10B | 7B | 8B |
| | | .11 | 1B | 5C | 5B | 3B | 6B | — | — |
| $CH_3CH_2$ | $CH_3$ | 11 | 10C | 10C | 10C | 10C | 10C | — | — |
| | | 2.2 | — | — | — | — | — | 9C | 10C |
| | | 1.1 | 5B | 8C | 10B | 5B | 10B | — | — |
| | | .22 | 0 | 2C | 5B | 3B | 3B | — | — |
| $CH_3CH_2CH_2$ | $CH_3CH_2$ | 11 | 0 | 8B | 6B | 6B | 6B | — | — |
| | | 2.2 | — | — | — | — | — | 6B 6Y | 6B |
| 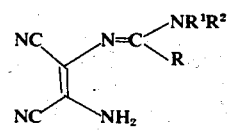 | $CH_3$ | 11 | 6C | 9B | 10B | 10B | 10B | — | — |
| | | 2.2 | — | — | — | — | — | 8C | 8B |
| | | 1.1 | 1B | 8C | 6C | 3B | 3B | — | — |

The embodiments of the invention in which an exclusive property or privilege is claimed are defined as follows:

1. A compound of the formula $$\begin{array}{c} NC \\ \diagdown \\ \quad\quad N=C\diagup NR^1R^2 \\ \diagup \quad\quad\quad\quad \diagdown R \\ NC \quad\quad NH_2 \end{array}$$

3. The compound of claim 2 in which R, $R^1$ and $R^2$ are each methyl; 2-amino-3-(N,N-dimethylaminoethylideneamino)maleonitrile.

4. The compound of claim 2 in which R is methyl and $R^1$ and $R^2$ are ethyl; 2-amino-3-(N,N-diethylaminoethylideneamino)maleonitrile.

* * * * *